United States Patent [19]

Kutschenreuter, Jr. et al.

[11] Patent Number: 5,255,513
[45] Date of Patent: Oct. 26, 1993

[54] METHOD OF OPERATING A SCRAMJET INCLUDING INTEGRATED INLET AND COMBUSTOR

[75] Inventors: Paul H. Kutschenreuter, Jr., Loveland; John C. Blanton, West Chester, both of Ohio

[73] Assignee: General Electric Company, Cincinnati, Ohio

[21] Appl. No.: 730,152

[22] Filed: Jul. 12, 1991

Related U.S. Application Data

[62] Division of Ser. No. 486,640, Feb. 28, 1990, Pat. No. 5,085,048.

[51] Int. Cl.$^5$ .......................... F02K 7/08; F02K 7/10
[52] U.S. Cl. ....................................... 60/204; 60/270.1
[58] Field of Search ............................... 60/204, 270.1

[56] References Cited

U.S. PATENT DOCUMENTS

| | | | |
|---|---|---|---|
| 3,280,565 | 10/1966 | Dugger et al. | 60/270 |
| 3,407,603 | 10/1968 | Kelley et al. | 60/204 |
| 3,430,446 | 3/1969 | McCloy | 60/270 |
| 3,535,882 | 10/1970 | Tizio et al. | 60/270 |
| 3,783,616 | 1/1974 | Norman et al. | 60/204 |
| 3,811,280 | 5/1974 | Wharton et al. | 60/207 |
| 3,864,907 | 2/1975 | Curran | 60/261 |
| 3,974,648 | 8/1976 | Kepler | 60/204 |
| 4,194,519 | 3/1980 | Baker et al. | 137/15.1 |
| 4,214,442 | 7/1980 | Reingold | 60/270 R |
| 4,291,533 | 9/1981 | Dugger et al. | 60/240 |
| 4,369,940 | 1/1983 | Kelly et al. | 244/3.21 |
| 4,381,017 | 4/1983 | Bissinger | 137/15.1 |
| 4,477,039 | 10/1984 | Boulton et al. | 244/53 B |
| 4,817,892 | 4/1989 | Janeke | 244/15 |
| 4,821,512 | 4/1989 | Guile et al. | 60/270.1 |
| 4,841,724 | 6/1989 | Hall et al. | 60/245 |
| 5,058,826 | 10/1991 | Coffinberry | 60/204 |

OTHER PUBLICATIONS

Bayev et al., "Combustion in a Supersonic Flow", Goreniye v. Sverkhzvukovom Potke, Publishing House, Nauka, Novosibirsk, 1984, pp. 216-218 and 251.

Hill and Peterson, Mechanics and Thermodynamics of Propulsion, copyright 1965, pp. 202-226.

Kenworthy et al., "Preliminary Results of Arc Tunnel Testing of Two-Dimensional Supersonic Combustors", GE Report R66-FPD 57, Feb. 1966, Cover and title pages, and pp. 22, 25, 51-54.

Northam et al., "Supersonic Combustion Ramjet Research at Langley", Program for Short Course in Hypersonic—Aug. 19-22, 1986, S.U.N.Y.A.B., four pages.

*Primary Examiner*—Richard A. Bertsch
*Assistant Examiner*—Howard R. Richman
*Attorney, Agent, or Firm*—Jerome C. Squillaro

[57] ABSTRACT

A scramjet engine is disclosed which is effective for use in a hypersonic aircraft as an aircraft-integrated scramjet engine. The engine includes a first surface having an aft facing step, and a cowl upper surface spaced from the first surface to define an integrated inlet-combustor therebetween. A method of operating the engine includes injecting fuel into the inlet-combustor at the step for mixing fuel with supersonic airflow for generating supersonic combustion gases in the inlet-combustor. In the preferred embodiment of the invention, the fuel is injected to create a fluid boundary defining a subsonic fuel zone and a supersonic fluid zone. The fluid boundary is variable and eliminates start and unstart problems requiring variable inlet geometry in a conventional scramjet engine.

9 Claims, 3 Drawing Sheets

METHOD OF OPERATING A SCRAMJET INCLUDING INTEGRATED INLET AND COMBUSTOR This is a division of application Ser. No. 07/486,640, filed Feb. 28, 1990 now U.S. Pat. No. 5,085,048

CROSS-REFERENCE TO RELATED APPLICATIONS

Reference is hereby made to the following copending U.S. patent application dealing with related subject matter and assigned to the assignee of the present invention: "Scamjet Combustor" by Daniel L. Harshman, assigned U.S. Ser. No. 07/327,831 and filed Mar. 23, 1989.

TECHNICAL FIELD

The present invention relates to supersonic combustion ramjets (i.e., scramjets), and, more particularly, to an improved scramjet engine for an aircraft operable at hypersonic speeds.

BACKGROUND OF THE INVENTION

A scramjet engine is a supersonic combustion ramjet, which unlike a conventional ramjet wherein inlet airflow and combustion gases flow subsonically, the inlet airflow and combustion gases of a scramjet flow supersonically. Conventional ramjets operate over a range of aircraft speeds from about Mach 3 to about Mach 6, and, conventional scramjets operate from about Mach 5 and above. The relatively high speed of an aircraft utilizing a scramjet in the flight regime of about Mach 5 or above is also referred to as hypersonic velocities.

It is not believed that a scramjet-powered aircraft has yet been built and flown. However, small research-type scramjet engines have been built and laboratory tested at simulated flight speeds up to about Mach 7. Accordingly, the references herein to conventional and typical scramjets and structures refers to information conventionally known to those skilled in the art of engines for powering aircraft at supersonic velocity, which is based, in part, on mathematical modeling and analysis.

Since scramjets operate on supersonic fluid flow therethrough, they are fundamentally different in structure and operation from conventional ramjet engines which operate with subsonic fluid flow therethrough. A typical scramjet engine includes a supersonic inlet, or diffuser, for compressing inlet airflow followed by a supersonic combustor and in turn followed by a supersonic exhaust nozzle. A supersonic inlet is a converging nozzle leading to a throat, and the supersonic nozzle is a diverging channel which is in flow communication with the throat. The combustor typically extends from the throat and is a constant area or diverging channel formed integrally with the diverging exhaust nozzle.

Fuel is added to the supersonic inlet airflow in the combustor for combustion which usually is spontaneous combustion since the inlet airflow has been compressed to temperatures of about 2000° R. and higher. However, since the fuel, which is typically gaseous hydrogen having relatively low momentum is injected into a supersonic airstream which has relatively high momentum, effective penetration of the fuel into the air and across the combustor and effective mixing of the fuel with the air is difficult to obtain, especially at high hypersonic flight speeds.

To permit the required internal compression at supersonic and hypersonic inlet airflow Mach numbers, means are conventionally provided to allow the inlet to "swallow" the normal shock which would otherwise stand at the entrance to the inlet. A conventional ramjet engine experiences such normal shock which decelerates the inlet airflow to subsonic Mach numbers with associated large losses in efficiency, relatively high heating rates, large structural loads, and relatively large drag over the ramjet engine. The inlet of a scramjet engine is considered "started" once the normal shock has been "swallowed" by the scramjet engine which results in supersonic airflow in the scramjet.

In the event of a sudden increase in back pressure occurring in the scramjet engine, such as for example, from high fuel flow transient, sudden angle of attack change of the aircraft, or local choking of the internal airflow, then the inlet may "unstart" with the attendant undesirable characteristics described above. This can be a significant problem for an aircraft operating at hypersonic velocity since that aircraft was designed with a scramjet engine having internal supersonic airflow. If the scramjet engine unstarts, the flow of air therethrough is no longer supersonic and since the aircraft is operating at hypersonic velocity, it is impossible to restart without additional means. Such means typically include conventionally known variable internal inlet geometry and high response control systems to permit inlet restarting. Since the inlet is typically initially started at relatively low hypersonic Mach numbers, any subsequent unstarts at relatively high hypersonic Mach numbers can represent a significantly more severe condition which must be accommodated.

Since a scramjet powered aircraft operates at substantial hypersonic velocity, drag over the scramjet engine is a substantial factor which should be minimized. However, variable internal inlet geometry scramjets are inherently relatively complex and relatively large and provide increased surface area with attendant relatively large drag associated therewith. A substantial weight penalty is also imposed.

Furthermore, a scramjet engine is typically utilized in an aircraft wherein engine inlet airflow is initially compressed externally of the scramjet by oblique shock waves from the aircraft bow, and the exhaust from the scramjet engine is typically channeled generally parallel to an inclined afterbody of the aircraft for providing external expansion of the supersonic combustion gases from the scramjet engine. Accordingly, the scramjet engine inlet airflow is typically channeled along the bow at an acute angle to the longitudinal or axial axis of the scramjet engine and then must be turned back away from the longitudinal axis to flow generally parallel to the inclined aircraft afterbody. This turning of hypersonic fluid flow first toward the longitudinal axis and then away from the longitudinal axis requires a suitable length of the scramjet engine which typically is relatively large therefore increasing the scramjet engine external surface area and drag. This turning of the scramjet inlet airflow back to the longitudinal or axial axis typically requires the introduction of flow expansion of the turning hypersonic fluid flow which inherently reduces the static temperature and static pressures from the levels achieved by the external compression, thusly substantially wasting much of the external compression which was paid for with irretrievable inlet losses and heating.

OBJECTS OF THE INVENTION

Accordingly, it is one object of the present invention to provide a new and improved scramjet engine.

Another object of the present invention is to provide a scramjet engine which does not require variable internal inlet geometry for starting.

Another object of the present invention is to provide a scramjet engine effective for turning hypersonic fluid flow in a relatively short longitudinal distance with reduced losses, and also with improved penetration and mixing of injected fuel.

Another object of the present invention is to provide a scramjet engine which is relatively simple in construction with relatively small drag inducing surface area.

Another object of the present invention is to provide a scramjet engine which is relatively short in length.

Another object of the present invention is to provide a scramjet engine having improved fuel penetration into and mixing with supersonic inlet airflow.

Another object of the present invention is to provide a scramjet engine having means for varying the contraction ratio of supersonic fluid flow therethrough.

Another object of the present invention is to provide a scramjet engine for an improved aircraft-integrated scramjet.

Another object of the present invention is to provide a scramjet having reduced weight.

DISCLOSURE OF INVENTION

An improved scramjet engine includes a first surface including an aft facing step and a cowl having an upper surface spaced from the first surface to define an integrated inlet-combustor therebetween. A method of operating the engine includes injecting fuel into the inlet-combustor at the step for mixing with supersonic inlet airflow for generating supersonic combustion gases. The first surface and the cowl upper surface are generally parallel to each other to eliminate structural internal contraction of the supersonic fluid flow therethrough. In a preferred embodiment, the fuel is injected for creating a fluid boundary extending from the step to define a subsonic fuel zone and a supersonic fluid zone.

BRIEF DESCRIPTION OF THE DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

MODE(S) FOR CARRYING OUT THE INVENTION

Figure 1:
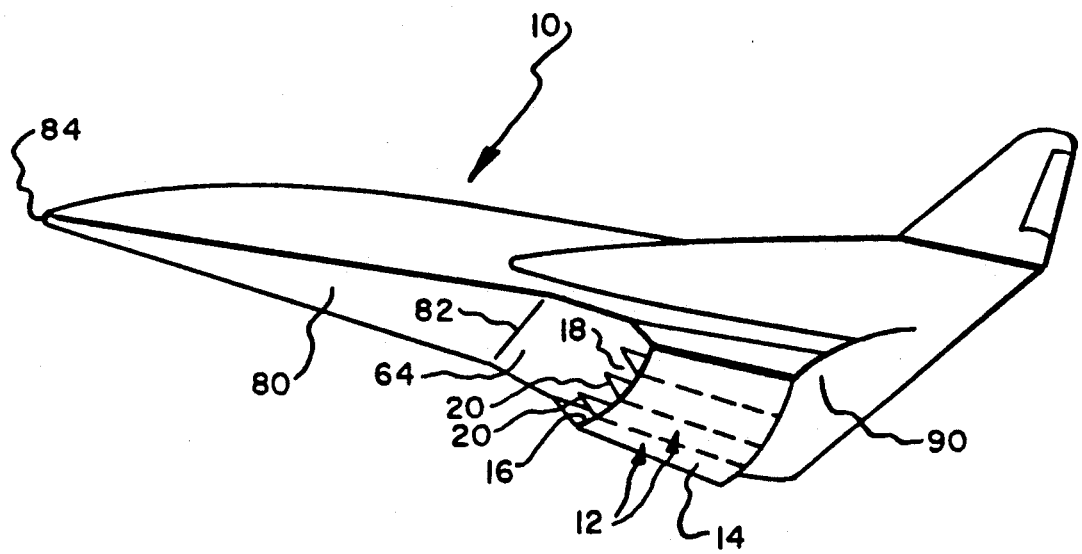
FIG. 1 is a schematic, perspective representation of an aircraft-integrated scramjet including a scramjet engine in accordance with a preferred, exemplary embodiment of the present invention.

Illustrated in FIG. 1 is a schematic, perspective view of a hypersonic aircraft 10 including four, substantially identical, side-by-side scramjet engines 12 in accordance with a preferred, exemplary embodiment of the present invention. The scramjet engines 12 are functionally integrated in the aircraft 10 as further described hereinbelow, and therefore, the scramjet engines 12 may alternatively be referred to as aircraft-integrated scramjets. Each of the scramjet engines 12 includes a cowl 14 which has an upper surface 16 spaced from and facing a first, midbody, internal surface 18 formed integrally with the aircraft 10. A transversely spaced pair of sidewalls 20 extend radially between the midbody surface 18 and the cowl upper surface 16 to define the generally rectangular scramjet engine 12. As illustrated in FIG. 1, several sidewall pairs 20 define four generally identical scramjet engines 12. The number of scramjet engines 12 is determined for particular applications of the aircraft 10 and may include less than or more than four scramjet engines 12. The aircraft 10 illustrated in FIG. 1 is designed for operation at hypersonic velocities with Mach numbers greater than about 5 and up to about Mach 18.

Figure 2:
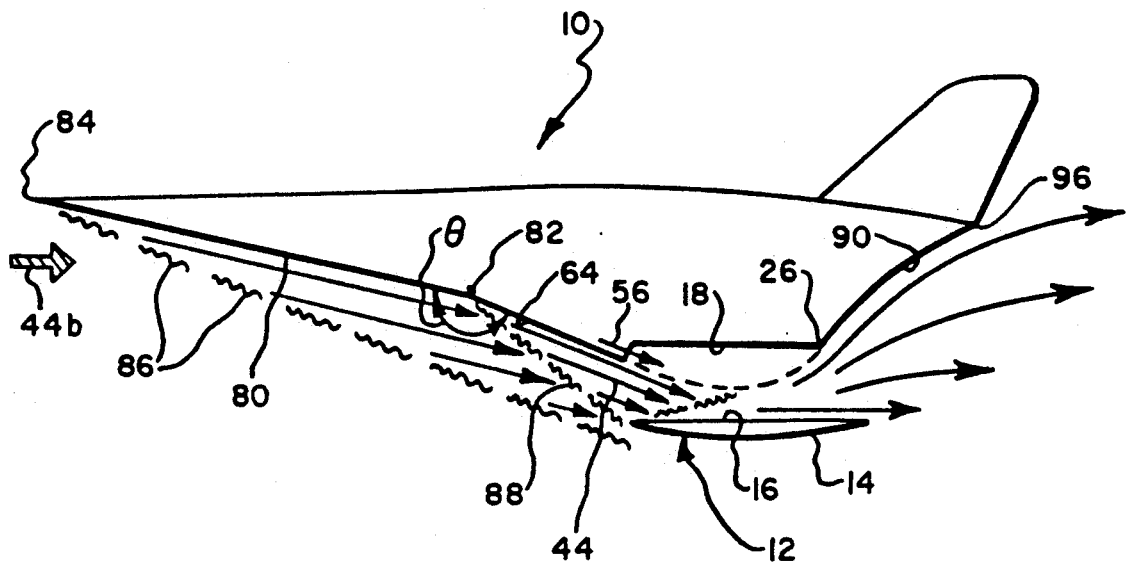
FIG. 2 is a schematic side, cross-sectional view representation of the aircraft-integrated scramjet illustrated in FIG. 1 illustrating operation of a scramjet engine in accordance with a preferred, exemplary operation of the present invention.
Figure 3:
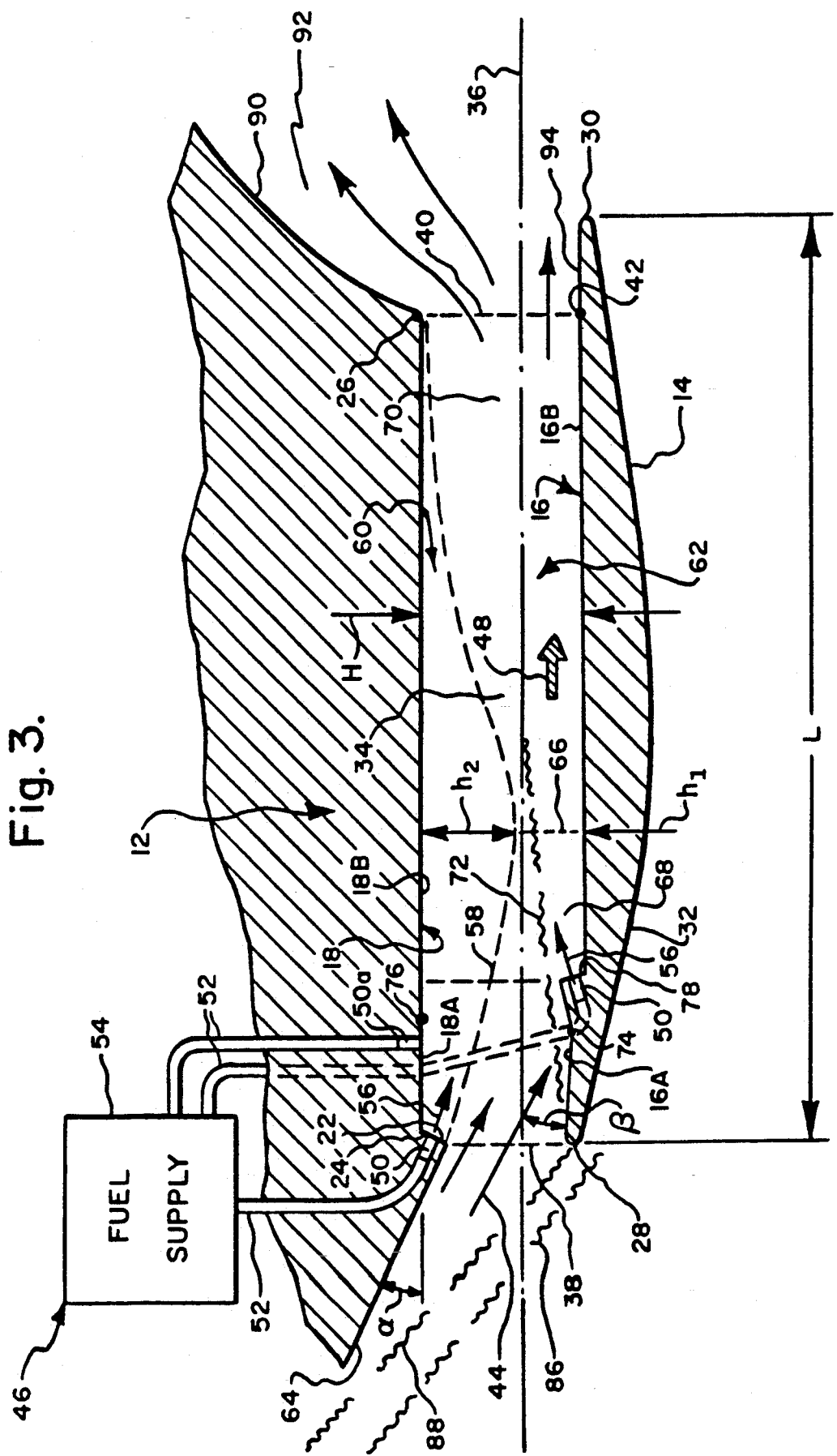
FIG. 3 is a schematic, partially sectional side view of one of the scramjet engines illustrated in FIGS. 1 and 2.

FIG. 2 illustrates a cross-section of the aircraft 10 through one of the scramjet engines 12. FIG. 3 is an enlarged view of the scramjet engine 12 illustrated in FIG. 2. Referring to both FIGS. 2 and 3, the first, midbody surface 18 includes an aft facing inclined step 22 at a forward end 24 thereof, and an opposite, aft end 26. The cowl 14 includes a leading edge 28 and a trailing edge 30, with the upper surface 16 and a cowl lower surface 32 extending between the leading edge 28 and the trailing edge 30. The cowl upper surface 16 is preferably spaced from and generally parallel to the midbody surface 18 in this exemplary embodiment of the invention to define an integrated inlet-combustor 34 therebetween having a longitudinal axis 36. The integrated-combustor 34 includes an inlet 38 extending from the step 22 to the cowl leading edge 28 and an outlet 40 extending from the midbody aft end 26 to a corresponding intermediate point 42 on the cowl upper surface 16. The outlet 40 is generally perpendicular to the longitudinal axis 36. The cowl leading edge 28 and the step 22 are generally aligned with each other along the longitudinal axis 36 to define the inlet 38 for receiving and channeling into the inlet-combustor 34 supersonic inlet airflow 44.

The scramjet engine 12 further includes conventional means 46 for injecting fuel into the inlet-combustor 34 at the step 22 for mixing with the supersonic airflow 44 for generating supersonic combustion gases 48 in the inlet-combustor 34. More specifically, the fuel injecting means 46 includes a plurality of transversely spaced conventional first fuel injectors 50 positioned preferably perpendicular to the step 22 and a respective plurality of fuel conduits 52 connecting the first injectors 50 to a conventional fuel supply 54 aboard the aircraft 10. The fuel injection means 46 further includes a plurality of second fuel injectors 50a disposed preferably perpendicular to the midbody surface 18 and downstream from and adjacent to the step 22, and a respective plurality of fuel conduits 52 connecting the second injectors 50a to the fuel supply 54. Fuel 56 is injected into the inlet-combustor 34 through the injectors 50 and 50a adjacent to the inlet 38.

In the preferred embodiment, the fuel 56 is hydrogen, initially supplied in a liquid state, which is relatively cold. As it flows through the conduits 52, the fuel 56 is used to cool adjacent aircraft and engine structures, and thus is heated to a gaseous state for injection into the combustor 34 from the injectors 50 and 50a for propelling the aircraft 10 at hypersonic velocities up to about Mach 18.

The integrated inlet-combustor 34 is defined by the sidewall pair 20, the midbody surface 18, and the cowl upper surface 16 and is generally rectangular in planes normal to the longitudinal axis 36. Other, non-rectangular cross-sections of the inlet-combustor 34 may alternatively be used depending upon the particular design applications.

As illustrated in FIG. 3, the fuel injecting means 46 is effective for injecting the fuel 56 from the first injectors 50 in the step 22 and from the second injectors 50a in an aft direction generally obliquely to the longitudinal axis 36 and adjacent to the midbody surface 18 for creating a fluid boundary 58 extending in an aft direction from the step 22 which provides a local shear interface zone for improved mixing of the fuel 56 and airflow 44. The fluid boundary 58 defines a subsonic region or fuel zone 60 adjacent to the midbody surface 18 and extending between the midbody surface 18 and the fluid boundary 58. The fluid boundary 58 also defines a supersonic fluid zone 62 extending from the fluid boundary 58 to the cowl upper surface 16.

The scramjet engine 12 further includes a second, forebody surface 64 extending upstream from the midbody surface 18 at a first acute angle $\alpha$ thereto and defining therebetween the aft facing step 22. The forebody surface 64 is a portion of the aircraft 10 and is effective for channeling the supersonic inlet airflow 44 parallel to the forebody surface 64 since supersonic fluid flow tends to flow generally parallel to surfaces. The airflow 44 is channeled at a second acute angle $\beta$ relative to the cowl upper surface 16, and in the preferred embodiment, the cowl upper surface 16 adjacent to the inlet 38 is disposed parallel to the midbody surface 18. Accordingly, the first acute angle $\alpha$, in such an arrangement, is generally equal to the second acute angle $\beta$. In an alternate embodiment, the angles $\alpha$ and $\beta$ may be different for accommodating different cowl geometry upstream of the step 22.

The step 22 is disposed generally normal to the forebody surface 64 and therefore, the fuel 56 from the injector 50 is channeled into the inlet-combustor 34 generally parallel to the airflow 44. Since the fuel 56 has a momentum which is substantially lower than the momentum of the supersonic airflow 44, the fluid boundary 58 forms at the step 22 initially parallel to the forebody surface 64 and inclined toward the cowl upper surface 16. The fuel 56 contacts the supersonic airflow 44 and is initially transported across the inlet and then turned away from the cowl upper surface 16 for generating a fluid boundary 58 which is arcuate and is spaced from the cowl upper surface 16 to define a throat 66 of minimum supersonic flow area in the supersonic fluid zone 62. The throat 66 has a height $h_1$ and the fuel zone 60 coplanar with the throat 66 has a height $h_2$ for an overall height $H = h_1 + h_2$ for the inlet-combustor 34. The cowl 14 has a length L and the aspect ratio H/L is relatively large for reasons described hereinbelow. Since the airflow 44 is channeled through the inlet 38 at an acute angle $\beta$ relative to the cowl upper surface 16, the high speed airflow 44 is effective for directing a portion of the fuel 56 from the fuel injectors 50 and 50a toward the cowl upper surface 16 for increased penetration and mixing of the fuel 50 and the inlet airflow 44 in the supersonic fluid zone 62.

Since the fluid boundary 58 creates the throat 66, it also defines a supersonic converging channel 68 from the inlet 38 at the cowl leading edge 28 to the throat 66 in the supersonic fluid zone 62. The fluid boundary 58 also defines a supersonic diverging channel 70 in the supersonic fluid zone 62 extending from the throat 66 to the outlet 40 and the cowl trailing edge 30 for channeling the supersonic combustion gases 48 formed from the fuel 56 and the supersonic inlet airflow 44. In addition to introducing the fuel 56 into the fuel zone 60, the fuel injection means 46 is also effective for injecting a portion of the fuel 56 through the fluid boundary 58 into the converging channel 68 toward the cowl upper surface 16 for mixing with the supersonic inlet airflow 44.

Additional mixing of the fuel 56 with the inlet airflow 44 is obtained by a cowl shock 72 extending from the cowl leading edge 28 obliquely into the converging channel 68. More specifically, the cowl upper surface 16 near the leading edge 28 is positioned relative to the inlet airflow 44 and the step 22 for obtaining the second acute angle $\beta$ effective for generating the cowl shock 72 extending obliquely from the cowl leading edge 28 and into the converging channel 68.

A significant feature of the present invention, is the formation of the fluid boundary 58 which defines the converging channel 68, throat 66 and diverging channel 70. Instead of utilizing a fixed structural boundary for defining the throat 66 and the channels 68 and 70 as is conventionally done in the prior art, the use of the fluid boundary 58 provides additional advantages therefrom while still creating an effective converging channel 68, throat 66 and diverging channel 70.

Another significant feature is the synergism between the high momentum airflow 44 at angle $\alpha$, with the lower momentum fuel 56 from the injectors 50 and 50a, which results in improved fuel penetration by the airflow 44 transporting the fuel 56 across the inlet 38. The fuel 56 injected into the inlet-combustor 34 has relatively low momentum when compared to the momentum of the supersonic airflow 44 thus creating the boundary 58 and the subsonic fuel zone 60 near the wall 18 which is a small portion of the fuel 56 and comprises substantially only fuel 56 moving at subsonic velocity without any significant amount of the airflow 44. The majority of the fuel 56 is mixed with the airflow 44 and is contained in the supersonic fluid zone 62. This is due in large part to the improved penetration of the fuel 56 into the airflow 44 by the fuel injecting means 46 and the step 22, whereby the fuel 56 is transported by local airflow 44 initially generally parallel to the airflow 44 at the angle $\alpha$. The local shear interface zone of the fluid boundary 58 then assists in mixing of the fuel 56 and the airflow 44 to form the supersonic fluid zone 62 having mixed fuel 56 and airflow 44.

More specifically, the converging channel 68 acts as a conventional supersonic diffuser for further increasing static pressure of the airflow 44 in the inlet-combustor 34 and the diverging channel 70 acts as a conventional supersonic nozzle for increasing velocity of the combustion gases 48 flowing therethrough. Since the fluid boundary 58 is formed by the fuel injecting means 46, the configuration of the fluid boundary 58 may be tailored by controlling the volume or velocity of the fuel 56 injected from the injectors 22. In this manner, the relative heights $h_1$ of the throat 66 and $h_2$ of the fuel zone 60 may be selectively changed in response to the conditions of the inlet airflow 44 occurring over a range of flight Mach numbers of the aircraft 10 and the corresponding range of velocity of the inlet airflow 44. The fuel injection means 46 is thereby effective for varying the configuration of the fluid boundary 58 by controlling the volume or velocity of the fuel 56 injected into the inlet-combustor 34 for providing a variable contraction ratio of the inlet airflow 44 in the converging channel 68 and a variable expansion ratio of the combustion gases 48 in the diverging channel 70.

This is particularly significant, since a flexible and variable fluid boundary 58 is provided, the fixed geometry boundary associated with conventional scramjet engines for providing internal contraction of the airflow is eliminated, thus effectively eliminating the start and unstart problems. The fluid boundary 58 is a flexible boundary which reduces if not eliminates the unstart problem because in the event of any unstart, the scramjet engine 12 may be restarted simply by controlling the amounts of the fuel 56 injected into the inlet-combustor 34. The height H of the inlet-combustor 34 is relatively large to accommodate the flow requirements of the airflow 44 in the inlet-combustor 34 at relatively low hypersonic velocities by increasing the throat height $h_1$ and decreasing the fuel zone height $h_2$. At higher hypersonic velocities of the aircraft 10 and the inlet airflow 44, the throat height $h_1$ may be made relatively smaller and the fuel zone height $h_2$ may be made relatively larger by the introduction of the fuel 56 for accommodating the relatively higher velocity airflow 44 at such higher hypersonic velocities.

Furthermore, the inlet-combustor 34 is considered integrated since the conventional supersonic inlet diffuser and conventional diverging channel combustor are replaced by generally parallel walls i.e., the midbody surface 18 and the cowl upper surface 16, and the fuel 56 is introduced at the upstream end i.e., the inlet 38 at the step 22 and the cowl leading edge 28. This structure, therefore, introduces the fuel 56 immediately into the integrated inlet-combustor 34 instead of downstream as typically occurs in a conventional scramjet engine. The fuel 56 therefore by being introduced earlier into the scramjet engine 12 can begin and complete combustion earlier. Accordingly, the overall length L of the integrated inlet-combustor 34 may be relatively short compared to conventional scramjet engines even though the aspect ratio H/L is relatively higher than the aspect ratio of a conventional scramjet engine. The reduced length of the integrated inlet-combustor 34 minimizes the surface area of the cowl 22 and thereby minimizes undesirable drag thereover, and permits reduced structural weight.

In the preferred embodiment, the cowl upper surface 16 is planar from the leading edge 28 to the trailing edge 30 and the midbody surface 18 is also planar from its forward end 24 to its aft end 26; and the integrated inlet-combustor 34 has a substantially constant flow area defined between these surfaces and the sidewall pairs 20.

The cowl upper surface 16 may further include a forward portion 16A and an aft portion 16B extending therefrom at an intersection point 74 spaced longitudinally aft of the cowl leading edge 28. Similarly, the midbody surface 18 may include a forward portion 18A and an aft portion 18B extending downstream therefrom from an intersection point 76 spaced downstream from the midbody forward end 24. In the preferred embodiment, the cowl surface forward portion 16A is disposed parallel to the midbody forward portion 18A, and the cowl surface aft portion 16B is disposed parallel to the midbody aft portion 18B. As described above, the respective forward and aft portions of the midbody 18 in the cowl upper surface 16 are planar. However, in an alternate embodiment, the midbody aft portion 18B may be inclined upwardly relative to the midbody forward portion 18A, and similarly, the cowl upper surface aft portion 16B may be inclined upwardly relative to the cowl upper surface forward portion 16A for assisting in changing the direction of the combustion gases 48 in the inlet-combustor 34. Since the inlet airflow 44 enters the inlet 38 at the acute angle $\beta$ and the combustion gases 48 are discharged from the outlet 40 at a generally opposite angle relative to longitudinal axis 36, the midbody surface 18 and the cowl upper surface 16 may be inclined as above described for assisting in changing the direction of the supersonic fluid for reducing losses associated therewith.

The cowl upper surface 16 may optionally include an aft facing step 78, as illustrated in FIG. 3, at the intersection point 74 joining the cowl surface forward portion 16A to the cowl surface aft portion 16B. The fuel injection means 46 is also effective for injecting the fuel 56 into the inlet-combustor 34 at the cowl aft facing step 78 through additional ones of the fuel injectors 50 channeled with fuel 56 from additional ones of the fuel conduits 52 from the fuel supply 54. In this way, additional fuel 56 may be introduced into the inlet-combustor 34 downstream from the cowl leading edge 28 and the primary injectors 50 at the step 22.

The scramjet engine 12 is preferably incorporated into the aircraft 10 as an aircraft-integrated scramjet and further includes a third, bow surface 80 as illustrated in FIG. 2 extending upstream from the forebody surface 64 at an inflection point 82. The bow surface 80 is disposed at an obtuse angle $\theta$ to the forebody surface 64 and extends to an aircraft leading edge 84. The bow surface 80 is effective for generating an oblique bow shock 86 in the ambient or freestream airflow 44b from the aircraft leading edge 84 at supersonic aircraft velocities as is conventionally known. The forebody surface 64 is similarly effective for generating an oblique forebody shock 88 in the airflow 44b, from the inflection point 82 as is also conventionally known. Both the bow and forebody shocks 86, 88 provide compression of the airflow 44b, which is also referred to as recompression, which is channeled into the inlet 38 of the integrated inlet-combustor 34 at the cowl leading edge 28 as the inlet airflow 44. In a preferred embodiment, the bow surface 80 and the forebody surface 64 are positioned relative to the cowl leading edge 28 for generating the bow and forebody shocks 86, 88 which are substantially entirely channeled into the inlet 38 as illustrated in FIG. 3. In this way, recompression of the inlet airflow 44 from the bow and forebody shocks 86 and 88 is channeled into the inlet 38 for providing optimum external compression of the inlet airflow 44.

In the aircraft-integrated embodiment of the scramjet engine 12 illustrated in FIGS. 1-3, the scramjet engine 12 further includes a fourth, afterbody surface 90 extending downstream from the midbody surface 18 at its aft end 26 and also from the outlet 40 of the scramjet engine 12 which extends to the cowl upper surface 16 at the intermediate point 42. The afterbody surface 90 is preferably arcuate and defines a portion of a boundary of a supersonic exhaust nozzle 92 of the engine 12 for discharging the combustion gases 48 from the integrated inlet-combustor 34. The cowl 14 may include a nozzle portion 94 which extends from the intermediate point 42 to the cowl trailing edge 30. The cowl nozzle portion 94 defines a portion of the boundary of the exhaust nozzle 92. The supersonic combustion gases 48 are channeled through the exhaust nozzle 92 and expand internally therein up to the cowl trailing edge 30 and externally from the cowl trailing edge 30 and against the afterbody surface 90 which extends to a trailing edge 96 of the aircraft 10.

The fuel injection means 46 is also effective for varying the configuration of the fluid boundary 58 in response to the inlet airflow 44 for providing a variable expansion ratio of the combustion gases 48 in the diverging channel 70 in the inlet-combustor 34. The fuel injection means 46 is effective for causing the fluid boundary 58 to preferably intersect the scramjet outlet 40 at the afterbody surface 90 at about midbody aft end 26. In this way, the diverging channel 70 is continuous with exhaust nozzle 92 formed with the afterbody surface 90 as one boundary for providing efficient expansion of the combustion gases 48 from the integrated inlet-combustor 34 and through the exhaust nozzle 92.

In addition to the advantages described above with respect to the scramjet engine 12 in accordance with the present invention, other advantages include avoidance of significant internal expansion of the combustion gases 48 as they are turned from the direction of the inlet airflow 44 to the direction of the combustion gases 48 discharged from the outlet 40 along the afterbody surface 90. This is due to the subsonic fuel zone 60 in the inlet-combustor 34 which provides the fluid boundary 58 which is self adjusting to reduce internal expansion of the combustion gases 48 and the attendant pressure losses therewith. The total length L of the inlet-combustor 34 is substantially shorter than the length of a conventional inlet and combustor due in large part to the introduction and combustion of the fuel 56 at the inlet 38 disposed at the midbody forward end 24 and the cowl leading edge 28. The fuel 56 begins its combustion sooner than in a conventional combustor and results in higher static pressure of the combustion gases 48 due to combustion, (i.e., recombination). A shorter scramjet engine 12 results in less weight, lower external drag, and less surface area required to be cooled as compared to conventional scramjet engines.

Figure 4:
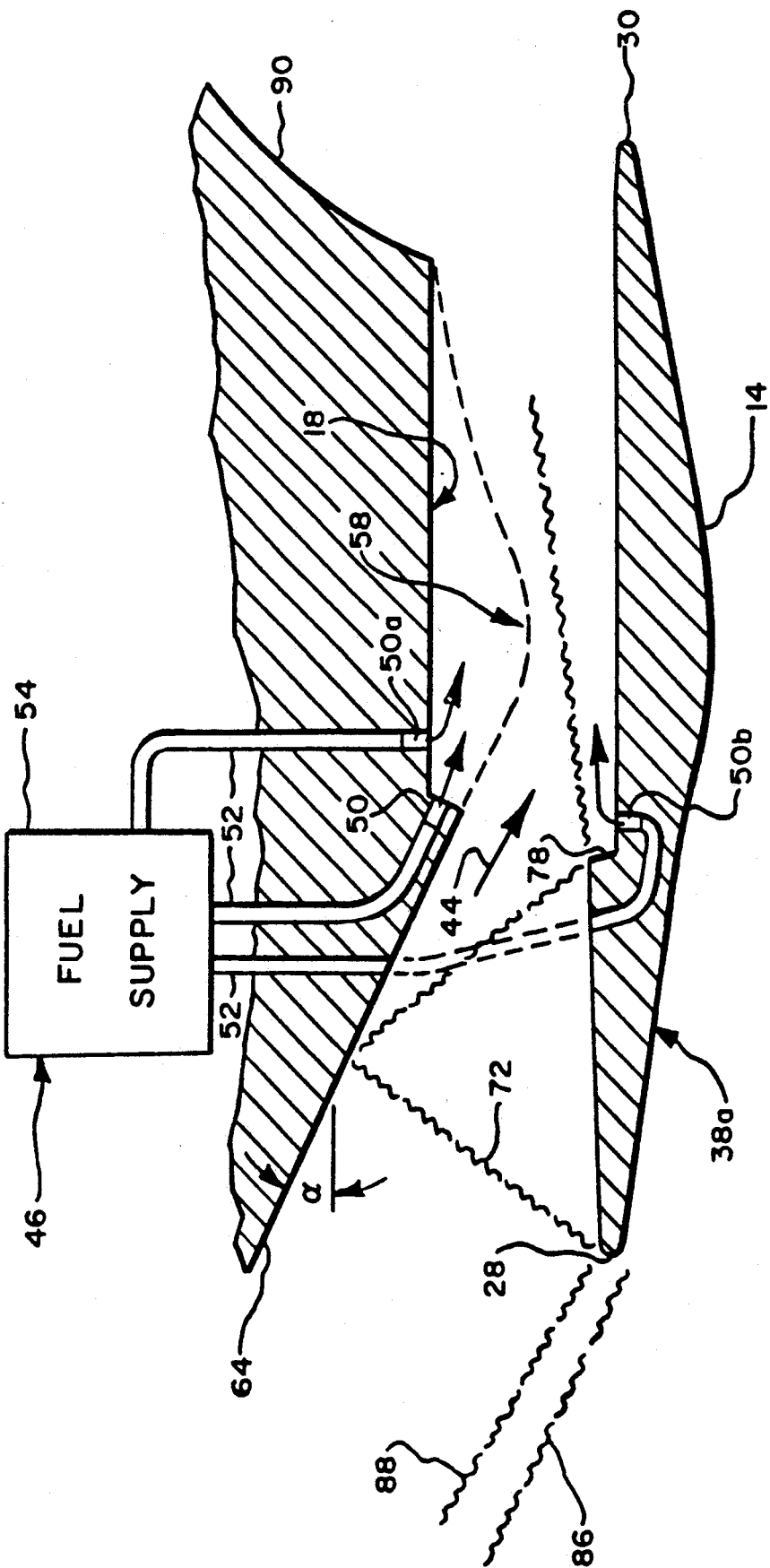

FIG. 4 illustrates another embodiment of the invention which is generally similar to the embodiment illustrated in FIG. 3 except for its inlet 38a. The inlet 38a is defined by the cowl leading edge 28 being positioned upstream relative to the aft facing step 22 to define with the forebody surface 64 the inlet 38a having a converging profile extending to the aft facing step 22.

The inlet 38a is effective for obtaining internal contraction of the airflow 44 prior to being mixed with the fuel 56. This additional contraction, or compression, of the airflow 44 by the inlet 38a is required for operating the aircraft 10 at higher hypersonic flight speeds than those associated with the embodiment illustrated in FIG. 3. Although the self-starting and restarting advantages of the invention may not be realized in this embodiment, the advantage of improved fuel penetration and mixing with the airflow 44 is retained and is of substantial importance, especially for the even higher speed operation of the aircraft 10 wherein the difference in momentum of the fuel 56 and airflow 44 becomes even greater than that occurring at lower hypersonic velocities.

Of particular significance in both embodiments of the invention illustrated in FIGS. 3 and 4 are the steps 22 and 78. The step 22, for example, provides flame holding capability which allows the combustion flame to initiate and attach during operation. The step 22, along with the step 78 if utilized, also isolates the combustion pressure rise to prevent it from moving upstream past the step 22 which could disturb the inlet airflow 44 and possibly lead to an unstart condition.

Furthermore, the step 22 preferably includes the first fuel injectors 50 for obtaining the improved fuel penetration and mixing advantages of the invention. However, the fuel injectors need not necessarily be disposed in the step 22. As shown in FIG. 3, for example, some, or all, of the injectors (e.g., injectors 50a), may be disposed immediately downstream of the step 22 in the midbody surface 18. The injectors are preferably positioned so that they inject the fuel 50 obliquely to the airflow 44 for improving fuel penetration and mixing.

As shown in the embodiment illustrated in FIG. 4, the fuel injectors 50b may be disposed in the cowl upper surface 16 immediately downstream of the cowl step 78, instead of in the cowl step 78 as shown in the FIG. 3 embodiment.

The various embodiments of the invention described above carry out a new and improved method of operating the scramjet engine 12. As described above, the method of operation includes channelling the airflow 44 at the first acute angle $\alpha$ relative to the longitudinal axis 36 and then turning the airflow 44 to flow generally parallel to the longitudinal axis 36. The fuel 56 is then injected obliquely into the airflow to form the arcuate fluid boundary 58. Additional steps, include those operations described above with respect to the preferred embodiments.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

More specifically, and for example only, the integrated inlet-combustor 34 may be used with either a two-dimensional axisymmetric, or three-dimensional cross-section flowpath. The selection is made for permitting optimum integration of the scramjet engine in a particular aircraft. Multiple fuel injection ports (e.g. 50, 50a and 50b) may be used in the midbody surface 18 and the cowl upper surface 16 and may comprise a combination of perpendicular or angled fuel injection for enhancing performance over wide ranges of freestream Mach numbers. Furthermore, as described above, the second step 78 in the cowl 14 may have a zero height, and perpendicular fuel injection may be introduced at that location, for example, where the flow passage height at the plane of the cowl leading edge 28 is relatively small and the Reynolds number of the incoming airflow 44 on the cowl surface forward portion 16A provides a reasonably stable turbulent boundary layer. Although a particular advantage of the present invention is the elimination of variable inlet geometry, the invention may nevertheless be used in other embodiments in conjunction with variable geometry to control both the amount of airflow compression achieved and area distribution in the combustor region of the integrated inlet-combustor 34.

Additional embodiments of the invention may include an inlet combustor 34 having portions disposed generally symmetrically about two longitudinal centerline axii intersecting each other at an obtuse angle for turning the airflow 44 from along the forebody surface 64 to along the afterbody surface 90. Also, the inlet 38 and the outlet 40 need not necessarily be positioned perpendicular to the longitudinal axis 36.

Accordingly, what is desired to be secured by Letters Patent of the United States is the invention as defined and differentiated in the following claims.

We claim:

1. A method of operating a scramjet engine having a combustor defined between a first surface and a cowl upper surface and having a longitudinal axis, an inlet, an aft facing step extending from said first surface at said inlet, and an outlet, said cowl upper surface being disposed generally parallel to said first surface, said method comprising the steps of:

channeling supersonic airflow into said inlet of said combustor at an acute angle to said longitudinal axis;

turning said airflow channelled into said engine to flow generally parallel to said longitudinal axis;

injecting fuel into said combustor at said inlet generally parallel to said supersonic airflow being channelled at said acute angle and obliquely to said longitudinal axis to contact said supersonic airflow being channelled at said acute angle so that said injected fuel is transported by said supersonic airflow being channelled at said acute angle initially generally parallel thereto to form an arcuate fluid boundary extending from said step to define a subsonic fuel zone extending from said fluid boundary to said first surface and a supersonic fluid zone extending from said fluid boundary to said cowl upper surface, said supersonic fluid zone having said fuel mixed with said supersonic airflow; and channelling said injected fuel and said supersonic airflow through said combustor to said outlet at a substantially constant flow area.

2. A method according to claim 1 wherein said fuel is injected into said combustor with a momentum lower than a momentum of said supersonic airflow.

3. A method according to claim 1 wherein said fluid boundary is spaced from said cowl upper surface to define a throat of minimum supersonic flow area in said supersonic fluid zone, and a supersonic converging channel from said inlet to said throat in said supersonic fluid zone.

4. A method according to claim 3 wherein said fluid boundary further defines a supersonic diverging channel in said supersonic fluid zone from said throat.

5. A method according to claim 4 further comprising varying said fluid boundary for providing a variable contraction ratio in said converging channel and a variable expansion ratio in said diverging channel.

6. A method according to claim 4 wherein said fluid boundary intersects said first surface at about said outlet.

7. A method according to claim 4 wherein said subsonic fuel zone includes substantially only fuel.

8. A method according to claim 4 wherein said fuel is injected into said combustor at said step.

9. A method according to claim 8 further comprising injecting additional fuel into said combustor downstream from said fuel injected at said step.

* * * * *